(12) United States Patent
Kolodgie et al.

(10) Patent No.: US 8,874,281 B2
(45) Date of Patent: Oct. 28, 2014

(54) COOPERATIVE COMMUNICATION CONTROL BETWEEN VEHICLES

(75) Inventors: Shawn M. Kolodgie, Fredericksburg, VA (US); Michael J. Lavery, Fredericksburg, VA (US); Michael W. Lim, Fredericksburg, VA (US); Nicholas E. McCready, Colonial Beach, VA (US); Xavier Melendez, Fredericksburg, VA (US); Ashley R. Noble, Spotsylvania, VA (US); Ryan M. Ragsdale, King George, VA (US); Matthew Serbinski, Ruther Glen, VA (US); William Howard Thomas, II, King George, VA (US); Brian Thomas McLintock, West Jefferson, NC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 293 days.

(21) Appl. No.: 13/374,183

(22) Filed: Nov. 29, 2011

(65) Prior Publication Data

US 2013/0282201 A1    Oct. 24, 2013

(51) Int. Cl.
*G05D 1/00*    (2006.01)
*G08G 1/123*   (2006.01)

(52) U.S. Cl.
USPC .......................................... 701/2; 340/995.28

(58) Field of Classification Search
CPC ..... G06F 17/00; G06F 1/1632; G06F 1/1694; G06F 3/0481
USPC .............. 701/2, 36, 300; 340/995.28, 426.24, 340/426.25, 539.22, 539.26, 902, 935, 938, 340/991.9, 95.17, 995.25, 426.16, 428
See application file for complete search history.

(56) References Cited

U.S. PATENT DOCUMENTS

2009/0102638 A1*  4/2009  Olsen et al. ................... 340/505
2011/0287733 A1*  11/2011 Cepuran et al. ............ 455/404.1

* cited by examiner

*Primary Examiner* — Muhammad Shafi
(74) *Attorney, Agent, or Firm* — Gerhard W. Thielman, Esq.

(57) ABSTRACT

A method is provided for receiving sensor information by a plurality of motor vehicles with respect to sensor information regarding locations of objects; sharing the sensor information by the plurality of motor vehicles; displaying the shared sensor information on a user interface on each of the plurality of motor vehicles; and controlling the receiving, sharing, and displaying the sensor information with a software library.

3 Claims, 4 Drawing Sheets

COOPERATIVE COMMUNICATION CONTROL BETWEEN VEHICLES

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to command and control communication. In particular, the invention relates to such communication between motor vehicles.

Synexxus Ekeel is a distributed network of vehicle to vehicle communication with multiple sensors. It provides platforms equipped with sensors that detect the direction and angle of incoming military projectiles and can share that data between vehicles to improve target fidelity.

The Shot Spotter Gunshot Location System alerts a user to gunfire and explosive events. It provides location of gunfire through networked sensors and a centralized command center. A camera can be directed to location of gunfire. As such, there is a need for a system for implementing cooperative communication control between vehicles.

SUMMARY

Conventional vehicle communication arrangements yield disadvantages addressed by various exemplary embodiments of the present invention. In particular, various exemplary embodiments provide a method that includes receiving sensor information from a plurality of motor vehicles, the sensor information including locations of objects; sharing the sensor information between users in the plurality of motor vehicles; displaying the shared sensor information on a user interface on each of the plurality of motor vehicles; controlling the receiving, sharing, and displaying of the sensor information with a software library.

Various exemplary embodiments provide a computer program product comprises computer-readable program code stored on a non-transitory computer-readable medium including: computer-readable program code configured to receive sensor information by a plurality of motor vehicles with respect to sensor information regarding locations of objects; computer-readable program code configured to dynamically add first sensors and delete specified second sensors; computer-readable program code configured to share the sensor information by the plurality of motor vehicles; and computer-readable program code configured to display the shared sensor information on a user interface.

In various exemplary embodiments, the system comprises a plurality of motor vehicles; a plurality of sensors positioned both inside the plurality of motor vehicles and separated from the plurality of motor vehicles; a software library; a plurality of cameras within the plurality of motor vehicles configured to respond to the plurality of sensors through control of the software library; the plurality of motor vehicles configured to receive input from the plurality of cameras by utilizing the software library; the plurality of motor vehicles configured to share the received input from the plurality of cameras with each of the other motor vehicles by utilizing the software library; and a user interface configured to display input from the plurality of motor vehicles regarding information received from the cameras by utilizing the software library, wherein the information displayed on the user interface is provided to a user in one of the motor vehicles.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
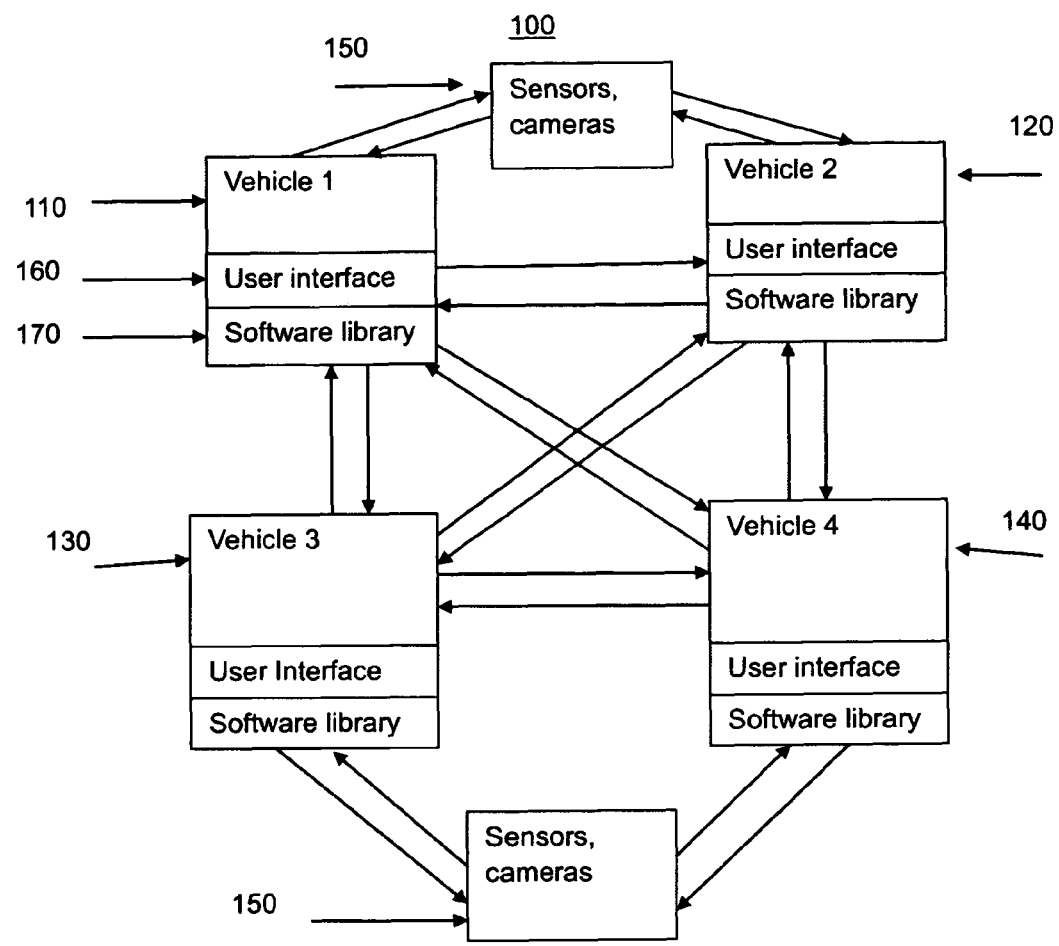
FIG. 1 is a flowchart of an exemplary communication system.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field programmable gate array (FPGA) or other related component.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present disclosure relates generally to methods of integrating hardware and software for common weapons and sensor control. Multiple stand-alone systems may create overcrowding and overworking of operators. Current stand-alone systems may require entering the same data multiple times and may require porting data across multiple systems. In view of the foregoing, there is a need for an integrated command and control system including a software library to integrate weapons and sensor command and control.

Aspects of the invention may provide a modular and reusable framework for rapid integration of software and hardware on a distributed and autonomous system for common weapons control that may be on different vehicles and different platforms. The invention may also include common operational and tactical procurement of sensory and camera information. Referring now to the drawings, these are presented for purposes of illustrating exemplary embodiments of the present disclosure only, and not for purposes of limiting the same.

FIG. 1 shows a flowchart of a system 100 of an exemplary embodiment of the invention. Vehicle 1 (110), Vehicle 2 (120), Vehicle 3 (130), and Vehicle 4 (140) (hereinafter vehicles) are shown. The arrows 145 between the vehicles indicate that the four vehicles send and receive information from each other. Sensors 150 may retrieve data for sending to the vehicles (110, 120, 130, 140). Such sensors 150 may include cameras, acoustic detection systems, diagnostic sensors, Global Positioning Systems (GPS), and inertial navigation units.

The sensors 150 may be located inside one of the vehicles (110, 120, 130, 140), and also at a remote location apart from the vehicles (110, 120, 130, 140). Cameras may include day cameras or infrared (IR) cameras. The system 100 may also control devices such as remotely operated gun mounts. Each of the vehicles (110, 120, 130, 140) may include a user interface 160 that interacts with a software library 170. The software library 170 may integrate command and control communication between the vehicles (110, 120, 130, 140). As an example, the same software library 170 may run on all the vehicles (110, 120, 130, 140).

Figure 2:
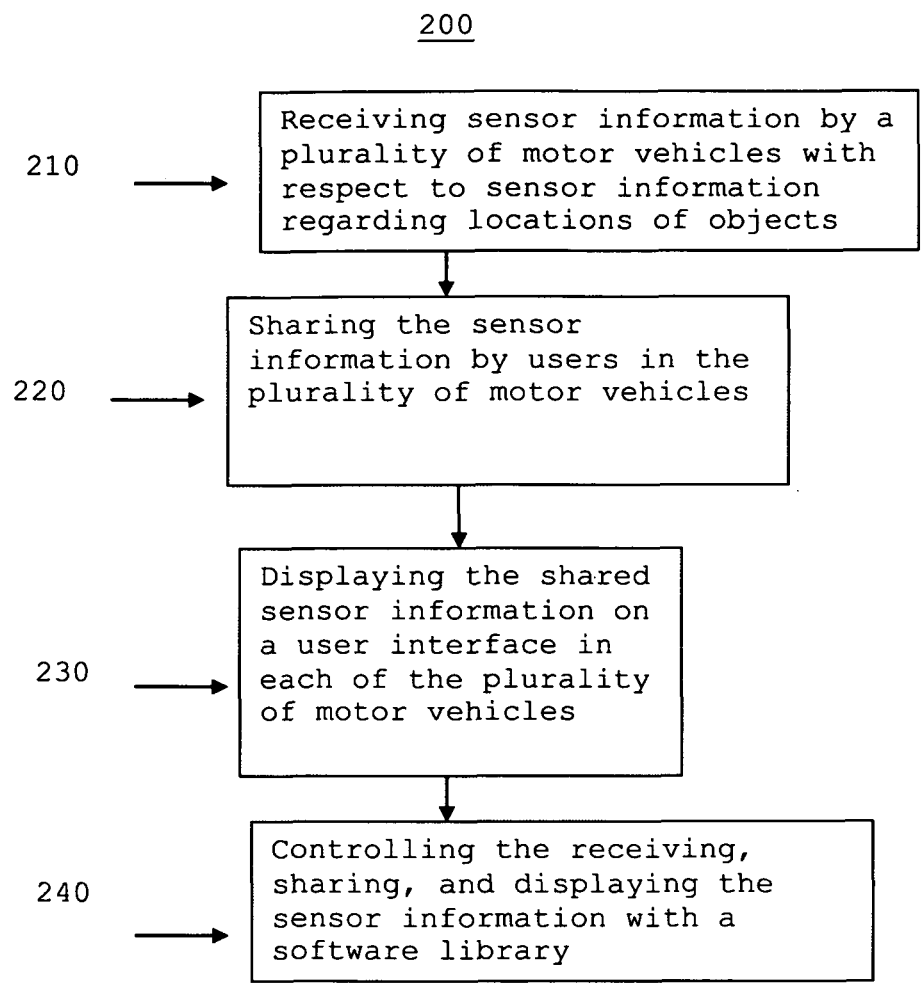
FIG. 2 is a flowchart of a method of the system in FIG. 1.

FIG. 2 shows a flowchart of a method comprising steps performed by an exemplary embodiment of the system in FIG. 1. Referring to FIGS. 2 and 1, a step 210 may include receiving sensor information by a plurality of motor vehicles with respect to sensor information regarding locations of objects. A step 220 may include sharing the sensor information by users in the plurality of motor vehicles. A step 230 may include displaying the shared sensor information on a user interface 160 in each of the plurality of motor vehicles. A step 240 may include controlling the receiving, sharing, and displaying of the sensor information with a software library 170.

Figure 3:
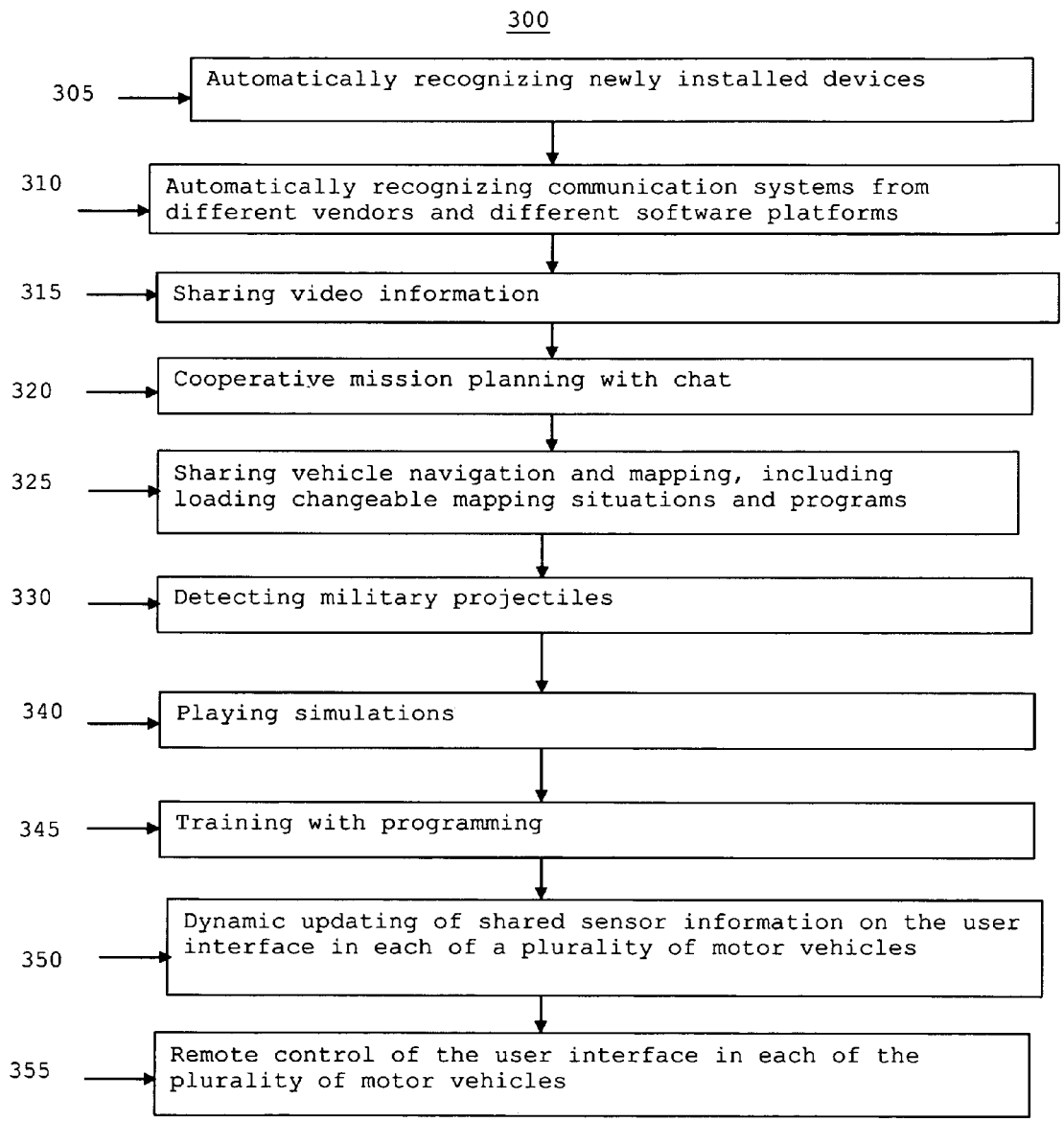
FIG. 3 is a flowchart of items in a software library according to an exemplary embodiment of the system shown in FIG. 1.

FIG. 3 shows a flowchart of items in a software library 300 according to an exemplary embodiment of the system shown in FIG. 1. Referring to FIGS. 3 and 1, the software library 300 may include a step 305 of automatically recognizing newly installed devices. The software library 300 may include a step 310 of automatically recognizing communication systems from different vendors and different software platforms. The software library 300 may include a step 315 of sharing video information.

FIGS. 3 and 1 may further include the software library 300 which may include a step 320 of cooperative mission planning with chat capability. For example, the software library 300 may include chat capability that may allow multiple users in different locations and platforms to communicate in a chat fashion. The chat capability may reduce radio chatter. Mission planning may include creation of reports. These reports may be used to keep records of events on a mission. The reports may be transmitted to other vehicles in the system 100 to persons making decisions. Decision makers may therefore make dynamic and near real-time decisions that may be displayed on the user interface 160 of each of the vehicles. The software library 300 may include a step 325 of sharing vehicle navigation and mapping, including loading changeable mapping situations and programs.

For example, a mapping framework may include an interface that allows swapping of multiple mapping engines. A newly installed mapping engine may be shared by existing mapping engines. For example, the swapping of mapping engines may be done with minimal changes to the interface 160 and no changes to the system 100 other than the interface 160. Users may perform common mapping operations such as loading and exporting map data, zooming, panning, and rotating, as well as interacting with map objects.

Referring further to FIGS. 3 and 1, the software library 300 may further include a step 330 of detecting military projectiles either in testing or live military operations. The software library may include a step 340 of playing back simulations and scenarios. The software library 300 may include a step 345 of training users to use the software library 300 with programming usable by the users. For example, the simulation may be used for training purposes. The software library 300 may include a step 350 of dynamic updating of shared sensor information on the user interface 160 in each of a plurality of motor vehicles (110, 120, 130, 140). The software library 300 may include a step 355 of remote control of the user interface 160 in each of the plurality of motor vehicles (110, 120, 130, 140). In an exemplary embodiment, the software library 300 may display symbols for a vehicle 110 or a point of interest. Points of interest may be a friend, foe, or neutral.

Figure 4:
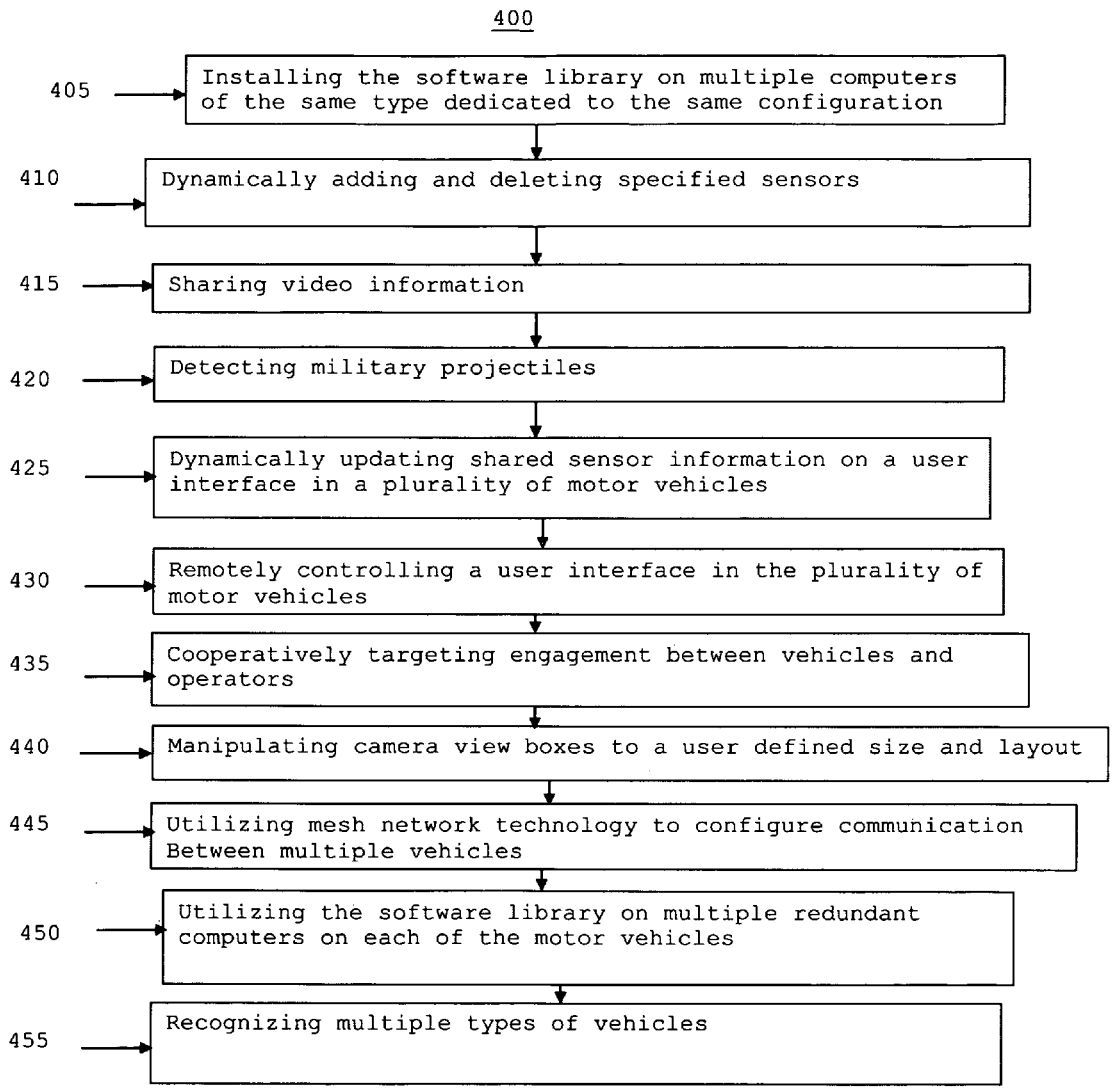
FIG. 4 shows additional features of the method of FIG. 2.

FIG. 4 shows additional features of the system of FIG. 1, performing steps according to an exemplary embodiment of the invention. Referring to FIGS. 4 and 1, a step 405 may include a user installing the software library 170 on multiple computers of the same type dedicated to the same configuration on multiple motor vehicles (110, 120, 130, 140). As an example, a vehicle 110 may have multiple instances of the software library 300 on the vehicle 110 with multiple operators. Each operator may use a user interface 160 with one instance of the software library 170 running each user interface 160. If a vehicle 110 has multiple user interfaces with their copies of the software library, only one of the user interfaces may communicate directly with the vehicle's hardware, and outside vehicles (110, 120, 130, 140), sensors and other devices. The user interface 160 that communicates with the vehicle 110 hardware and outside devices may be referred to as the primary user interface. The other user interfaces may communicate with hardware, other vehicles, and other users via the primary user interface. One of the other user interfaces may take over the primary user interface activity if the primary user interface is not working.

Referring further to FIGS. 4 and 1, FIG. 4 may further include a step 410 that may include dynamically adding and deleting sensors 150. A step 415 may include sharing entity information that may include video information. A step 420 may include detecting military projectiles, for example, in either a testing situation or in a live military operation. A step 425 may include dynamically updating entity information that may include shared sensor information on a user interface in a plurality of motor vehicles (110,120,130,140). For example, vehicle-to-vehicle communication data may include entity information that may include information on vehicles, targets, and positions of interest such as vehicle 110 position and heading information, vehicle 110 capability information, and target information including target status.

A step 430 may include remotely controlling a user interface 160 in the plurality of motor vehicles (110, 120, 130, 140). For example, each of the user interfaces in each of the motor vehicles may be controlled by a remote controller. A step 435 may include cooperatively targeting engagement between vehicles (110, 120, 130, 140) and operators. A step 440 may include manipulating camera view boxes to a user defined size and layout.

As an example, video streams from multiple cameras may be recorded at the same time, and triggered events may be recorded. Triggered events may be manual or from a sensor detection. If an acoustic detection triggers an event, a buffer of, for example, ten seconds before and ten seconds after the detection may be recorded. The buffer may vary in size. A step 445 may include utilizing mesh network technology. For example, vehicles may serve as relays for sending information between vehicles to configure communication between multiple vehicles (110, 120, 130, 140). A step 450 may include recognizing multiple types of vehicles (110, 120, 130, 140). For example, each of multiple vehicles (110, 120, 130, 140) may recognize the vehicle 110 type and model through sensor and communication information received from that vehicle 110 and other vehicles.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method for controlling communication between a plurality of motor vehicles, said method comprising:

receiving sensor information from the plurality of motor vehicles, the sensor information including;
   locations of objects,
   detections of projectiles, and
   navigation maps of the plurality of motor vehicles;
sharing the sensor information between users in the plurality of motor vehicles;
displaying the shared sensor information on a user interface on each of the plurality of motor vehicles; and
controlling the receiving, sharing and displaying of the sensor information via a software library.

2. The method of claim 1, including:

automatically recognizing communication equipment from different vendors and different software platforms.

3. The method of claim 1, including:

dynamically updating of the shared sensor information on the user interface in each of the plurality of motor vehicles.

\* \* \* \* \*